UNITED STATES PATENT OFFICE.

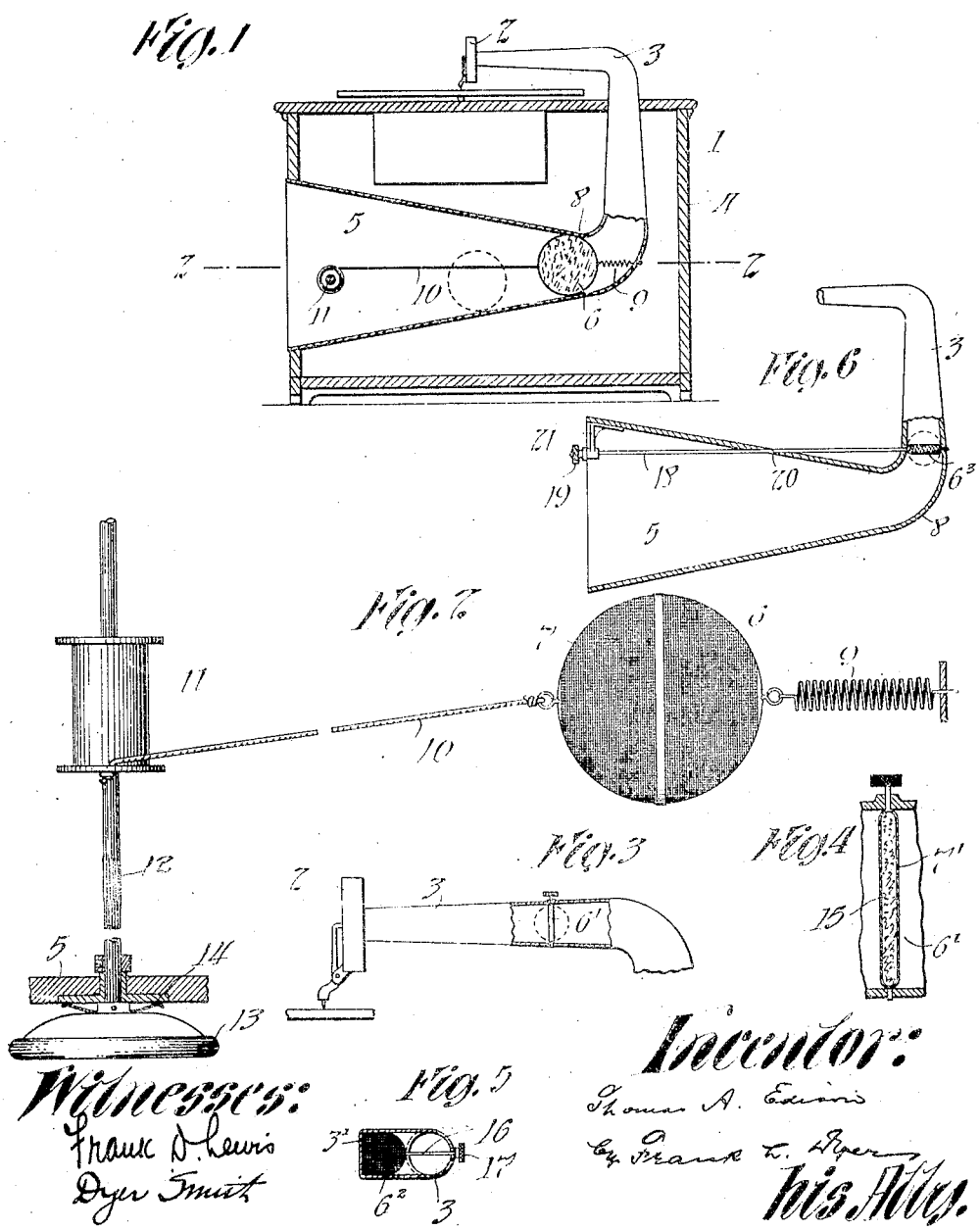

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

SOUND-MODIFIER.

1,110,382.  Specification of Letters Patent.  Patented Sept. 15, 1914.

Application filed December 9, 1910. Serial No. 596,536.

*To all whom it may concern:*

Be it known that I, THOMAS A. EDISON, a citizen of the United States, and a resident of Llewellyn Park, West Orange, Essex county, New Jersey, have invented certain new and useful Improvements in Sound-Modifiers, of which the following is a description.

My invention relates to devices for modifying or varying the volume or loudness of sound produced by a phonograph or talking machine. Such devices as commonly used comprise a metallic part, such as a butterfly valve, located at some point in the sound conveyer, which valve is opened to a greater or less extent to vary the area of cross section of the conveyer through which the sound reproduced passes. Such a device is objectionable because of the sharp angular deflection of the sound from the metallic surface. I have determined that a sound modifier should be of such nature as to permit the sound vibrations to pass through the same without deflection even when the modifier is in closed position, the intensity or amplitude of the vibrations being, however, lessened by their passage through the modifier.

One of the objects of my invention, accordingly, is to produce an efficient and serviceable device of this character.

Other objects of my invention reside in the details of construction and combinations of parts more particularly pointed out in the following specification and appended claims.

In order that my invention may be more clearly understood, attention is hereby directed to the accompanying drawing, forming part of this specification, and in which—

Figure 1 represents a vertical central section through a talking machine provided with a modifier embodying my invention, certain parts being shown in side elevation; Fig. 2 represents on an enlarged scale partly broken away of a cross section on line 2—2 of Fig. 1; Fig. 3 is a fragmentary view showing in side elevation and section a portion of a sound conveyer provided with a modification of my sound modifier; Fig. 4 is a detail sectional view showing the sound modifier of Fig. 3 on an enlarged scale; Fig. 5 represents in section another modification of my device adapted to be used in place of the modifier shown in Figs. 3 and 4; and Fig. 6 represents a partial section through a sound conveyer similar to that shown in Fig. 1, provided with a sound modifier similar to that illustrated in Figs. 3 and 4.

Referring to the drawings, the talking machine 1 comprises the reproducer 2 and the sound conveyer 3 carrying the same, which sound conveyer, as illustrated, has a portion rearwardly directed from the reproducer thence downwardly into the cabinet 4, and thence forwardly in the sound amplifying exit portion of the conveyer 5. It is, however, obvious that my improved sound modifier may be applied to the sound conveying passages of any other form of talking machine.

In the preferred form of my device, the sound modifier consists of a sphere 6 which preferably consists of a spherical container 7 within which is inclosed a loosely packed mass of cotton waste or horsehair, asbestos, cloth, or other cellular or fibrous material. The inclosing case is preferably of wire gauze. As shown in Figs. 1 and 2, modifier 6 is positioned within the large amplifying portion 5 of conveyer 3 and may completely fill the same at a point adjacent the bend or elbow 8 of the conveyer, or may be moved to the left as shown, for example, in dotted lines in Fig. 1, to a position in which it does not fill the sound passage. The modifier 6 is preferably moved into adjusted position and there held by the means illustrated, consisting of a spiral spring 9 secured to the rear side of the modifier 6, the other end of the spring being secured to the inside of the bend 8 of the conveyer. The forward side of the modifier has secured thereto a cord 10 which is adapted to be wound upon a bobbin 11 mounted upon a stem 12 which extends out through the wall of amplifier 5 and is provided on the exterior thereof with a knob 13 for turning the same. A spring 14, which is stronger than spring 9, may be interposed between knob 13 and the surface of amplifier 5 to hold the bobbin and sound modifier by friction in any adjusted position. When it is desired to move the modifier to the left, as shown in Fig. 1, knob 13 is turned in such a direction as to wind the cord 10 upon the bobbin 11. When it is desired to move the modifier to the right to restrict or close the air passage, the knob 12 is turned in the opposite direction to unwind the cord 10 from the bobbin.

When the modifier is in the position shown in full lines in Fig. 1, it completely fills the opening and the volume of sound produced by the machine will be a minimum, the volume increasing as the modifier is moved to the left allowing a certain amount of the sound to pass through the amplifier 5 without contacting the modifier. The amplifier 5 is preferably of a progressively increasing diameter as shown. When the modifier is in the position shown in full lines, the sound vibrations traveling through conveyer 3 pass through the same without deflection, but with their amplitude or intensity reduced so that the loudness of the sound reproduced is decreased. By forming the modifier as a sphere, the sound vibrations in the central portion of the conveyer will have a longer path through the modifier than those near the sides of the conveyer, and will, accordingly, be reduced in amplitude to a greater extent by the modifier. The energy of the vibrations adjacent to the sides of the conveyer, however, is dissipated to some degree by friction with the walls of the conveyer, so that the spherical modifier tends to equalize the intensity of the vibrations throughout the conveyer.

While I prefer to inclose the material of the modifier in a wire gauze container, it is not essential, although it is preferable because of its strength and durability. In place of the wire gauze a covering of silk or other material which would permit the passage of sound vibrations therethrough might be used.

In Figs. 3 and 4 I have illustrated another form of sound modifier consisting of the butterfly valve 6', which may be located in the horizontal arm of the sound conveyer 3. As illustrated, this form of modifier comprises a hollow disk-like container 7' preferably of wire gauze, the interior of the container being filled, as in the first form of my invention, with cotton waste, horsehair, or similar material 15. This valve may be placed in the position illustrated by full lines in Fig. 3, in which all the sound vibrations must pass therethrough, or may be rotated toward the position at right angles thereto, as illustrated by dotted lines in Fig. 3, in which practically none of the sound vibrations pass therethrough.

Another modified form of my device is illustrated in Fig. 5, in which the device is illustrated as a sliding valve 6². This valve is preferably formed of a wire mesh container with the fibrous or cellular material contained therein, as in the other forms of my invention. This valve may have a stem 16 attached thereto, stem 16 having a head or thumb piece 17 upon the end thereof outside the conveyer, whereby the same may be moved to cover to a greater or less extent the opening of the sound conveyer 3, as shown. The guide 3' for the slide valve may be positioned at any convenient point in conveyer 3.

In Fig. 6 I have illustrated a sound modifier 6³ in all respects similar to the butterfly valve 6' illustrated in Figs. 3 and 4, mounted preferably just above the bend 8 in conveyer 3. Valve 6³ has secured thereto or integral therewith the stem 18 extending forwardly in a horizontal direction and provided on its forward end, in a convenient position in front of the mouth of amplifier 5, with the head or thumb piece 19, by which modifier 6³ may be rotated as described in connection with Fig. 3. Stem 18 may be supported in any convenient manner. If it is desired to have the conveyer 3, including amplifier 5, oscillate during the reproduction of a record, stem 18 may pass through the wall of amplifier 5, as shown at 20, and be supported within the mouth of amplifier 5, as by a bracket 21.

Having now described my invention, what I claim as new therein and desire to protect by Letters Patent is as follows:—

1. In combination, a sound conveyer, a sound modifier mounted within said conveyer, and means comprising a rotatable bobbin and a flexible connection between said bobbin and modifier for moving said modifier into different positions in said conveyer, substantially as described.

2. In combination, a sound conveyer, a sound modifier mounted within said conveyer, resilient means tending to hold said modifier in one position in the air passage in said conveyer, means comprising a rotatable bobbing and a flexible connection between said bobbin and modifier for moving said modifier into other positions in said conveyer, and means normally preventing rotation of said bobbin, substantially as described.

3. In combination, a sound conveyer, a sound modifier mounted within said conveyer, resilient means tending to hold said modifier in one position in the air passage in said conveyer, means comprising a rotatable bobbin and a flexible connection between said bobbin and modifier for moving said modifier into other positions in said conveyer, and friction means for preventing rotation of said bobbin, substantially as described.

4. In combination, a sound conveyer, a sound modifier of a material permitting the passage of sound vibrations therethrough but with diminished intensity mounted within said conveyer, and means comprising a rotatable bobbin and a flexible connection between said bobbin and modifier for moving said modifier into different positions in said conveyer, substantially as described.

5. In combination, a sound conveyer, a sound modifier mounted within said conveyer, resilient means tending to hold said modifier in one position in the air passage in the said conveyer, and means comprising a rotatable bobbin and a flexible connection between said bobbin and modifier for moving said modifier into other positions in said conveyer, substantially as described.

6. In combination, a sound conveyer, a sound modifier mounted within said conveyer, and means comprising a movable member and a flexible member connecting said movable member and modifier for moving said modifier into different positions in said conveyer, substantially as described.

7. In combination, a sound conveyer, a sound modifier of a material permitting the passage of sound vibrations therethrough but with diminished intensity mounted within said conveyer, and means comprising a movable member and a flexible member connecting said movable member and modifier for moving said modifier into different positions in said conveyer, substantially as described.

8. In combination, a sound conveyer, a sound modifier mounted within said conveyer, resilient means tending to hold said modifier in one position in the air passage of the said conveyer, and means comprising a movable member and a flexible member connected to said movable member and modifier for moving said modifier into other positions in said conveyer, substantially as described.

This specification signed and witnessesd this 7th day of December 1910.

THOS. A. EDISON.

Witnesses:
DYER SMITH,
ANNA R. KLEHM.